United States Patent
Schlesener et al.

(10) Patent No.: US 8,755,502 B1
(45) Date of Patent: Jun. 17, 2014

(54) CALL CONTENTION MEDIATION AFTER DROPPED CALL

(75) Inventors: Matthew C. Schlesener, Olathe, KS (US); Brian D. Mauer, Lenexa, KS (US); Pallavur Sankaranaraynan, Overland Park, KS (US); Sean A. Isaacson, Raymore, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 1862 days.

(21) Appl. No.: 11/703,384

(22) Filed: Feb. 7, 2007

(51) Int. Cl.
*H04M 3/42* (2006.01)

(52) U.S. Cl.
USPC ...................... 379/201.01; 455/445

(58) Field of Classification Search
USPC ........... 379/201.01; 455/445, 412.1, 435–436
See application file for complete search history.

(56) References Cited

U.S. PATENT DOCUMENTS

| | | | | |
|---|---|---|---|---|
| 3,637,946 | A * | 1/1972 | Hamrick | 379/241 |
| 5,303,290 | A * | 4/1994 | Redberg et al. | 379/241 |
| 5,381,415 | A | 1/1995 | Mizutani | |
| 5,446,730 | A * | 8/1995 | Lee et al. | 370/351 |
| 5,930,712 | A * | 7/1999 | Byrne et al. | 455/437 |
| 5,995,830 | A * | 11/1999 | Amin et al. | 455/423 |
| 6,249,681 | B1 * | 6/2001 | Virtanen | 455/466 |
| 6,343,216 | B1 * | 1/2002 | Kim et al. | 455/450 |
| 6,445,918 | B1 * | 9/2002 | Hellander | 455/423 |
| 6,782,094 | B1 * | 8/2004 | Venz et al. | 379/279 |
| 7,395,057 | B2 * | 7/2008 | Awasthi et al. | 455/423 |
| 7,466,991 | B2 * | 12/2008 | Everson et al. | 455/552.1 |
| 7,486,949 | B2 * | 2/2009 | Ignatin | 455/414.1 |
| 7,545,920 | B2 * | 6/2009 | Wilson et al. | 379/112.01 |
| 7,818,003 | B2 * | 10/2010 | Callaghan | 455/435.1 |
| 7,894,800 | B2 * | 2/2011 | Ignatin | 455/414.1 |
| 2002/0049073 | A1 * | 4/2002 | Bell | 455/552 |
| 2002/0090947 | A1 * | 7/2002 | Brooks et al. | 455/436 |
| 2004/0198366 | A1 * | 10/2004 | Crocker et al. | 455/452.1 |
| 2005/0048981 | A1 * | 3/2005 | Anupam et al. | 455/445 |
| 2005/0070286 | A1 * | 3/2005 | Awasthi et al. | 455/436 |
| 2005/0174970 | A1 | 8/2005 | Krishnamurthi et al. | |
| 2007/0274488 | A1 * | 11/2007 | Callaghan | 379/201.01 |
| 2007/0291783 | A1 * | 12/2007 | Faber et al. | 370/461 |

OTHER PUBLICATIONS

George Staikos, [Kst] Fwd: DCOP: Deadlock protection and reentrancy, www.kde.org, www.staikos.net, Staikos Computing Services Inc., Oct. 6, 2004.
Connection upon collision, Gizmo Project Forum Forum Index-> Gizmo Project Requests, Powered by phpBB © 2001, 2005 phpBB Group.

* cited by examiner

*Primary Examiner* — Wiliam Deane, Jr.

(57) ABSTRACT

A call contention manager mediates between call contentions that occur when two callers attempt to place a telephone call to one another at approximately the same time. The call contention manager may be implemented in or separate from a mobile switching center. The manager detects a call contention between two calls, and it determines whether the call contention is taking place in a window of time that follows shortly after at least one of the callers was involuntarily dropped from a call. If a call contention occurs within such a call drop window, it is resolved according to a post-drop protocol that enables a connection between the callers. If, however, the call contention occurs outside any call drop window, it is resolved without establishing a connection between the callers, for example by sending one or more of the contending calls to voicemail.

19 Claims, 2 Drawing Sheets

CALL CONTENTION MEDIATION AFTER DROPPED CALL

BACKGROUND

This disclosure relates to wireless telecommunications. In particular, this disclosure relates to the resolution of a call contention condition after a wireless call is dropped.

Telecommunications systems have long dealt with the situation of "call collision" or "call contention" (formerly known as a "glare condition"). A call collision occurs when a telephone is attempting to establish an outbound telephone call, but before the outgoing call is established, an inbound call attempts to make contact with the same telephone. Telecommunications protocols generally specify how a call collision is handled. For example, the collision can be resolved by allowing the inbound call to take priority over the outbound call, or, alternatively, by allowing the outbound call to take priority over the inbound call. The call that does not have priority may be dropped.

In general, a call collision can occur when a first telephone attempts to call a second telephone at the same time as the second telephone attempts to call a third telephone. It is possible, though, for a call collision to occur with only two telephones, if the two telephones attempt to call one another at approximately the same time. This situation can be referred to as a symmetric call contention. In some telecommunications protocols inbound calls take precedence over outbound calls. The result in such protocols is that the outbound call associated with each telephone is dropped. Since both outbound calls are dropped, though, there is no longer any inbound call to be answered, and no connection will be made. The same problem arises if the telecommunications protocol gives precedence to outbound calls.

In some cellular telephone communication networks, symmetric call collision can result in both callers being routed to voicemail systems. When two callers attempt to call one another at approximately the same time, both callers are making use of the signaling channel. The network recognizes that the signaling channel is occupied, and it routes both calls to voicemail. This situation can arise when two parties are on a voice call with one another and their call is unintentionally disconnected. The unintentional disconnection of a call, called a "call drop," can occur in a cellular telephone network as a result of a system problem, a cellular tower handoff problem, lack of channel availability, a dead spot in RF (radio frequency) coverage, or for other reasons. The two parties may then immediately and simultaneously attempt to call one another back, only to have the calls "collide." Both of the callers are, frustratingly, routed to the voicemail of the person with whom they were just speaking.

The likelihood that two dropped callers will simultaneously attempt to re-establish contact is increased by the more widespread use of mobile stations (and even Caller-ID-enabled land line telephones) with an interactive "call log" that lists both incoming and outgoing telephone numbers. Without such a feature, the party who originally placed the call could typically activate a "redial" feature, while the party originally on the receiving end may not even know the caller's telephone number. If both callers have interactive call logs, though, it is easier for both to call one another at approximately the same time simply by selecting the newest entry in the call log.

U.S. Pat. No. 6,782,094 attempts to address the problem of two devices simultaneously attempting to call one another. It describes a system in which endpoints generally communicate over a primary network. In case of a failure in the primary network, the endpoints automatically attempt to communicate over a backup network. If a glare condition is detected in the backup network, each of the endpoints performs an algorithm to decide which endpoint is dominant. The non-dominant endpoint backs off and waits, while the dominant endpoint tries to reconnect. Each endpoint determines whether it is dominant by, for example, comparing its telephone number with that of the other endpoint, with the largest telephone number being dominant.

It has been recognized, though, as described in U.S. Pat. No. 5,056,083, that automatic resolution of call collision between human users can result in confusion and discomfort. A user generally expects, after dialing a party, to hear a ringback tone, followed by the voice of the party they have called. If two users are connected together, with each believing he has called the other, there will be a moment of confusion as the parties attempt to determine first, to whom they are speaking, and second, how it is that they came to be connected.

It would be desirable to mediate call collision events in a way that provides an improved user experience.

SUMMARY

A call contention manager mediates between call contentions that occur when two callers attempt to place a telephone call to one another at approximately the same time. The call contention manager may be implemented in or separate from a mobile switching center. The manager detects a call contention between two calls, and it determines whether the call contention is taking place in a window of time that follows shortly after at least one of the callers was involuntarily dropped from a call. If a call contention occurs within such a call drop window, it is resolved according to a post-drop protocol that enables a connection between the callers. If, however, the call contention occurs outside any call drop window, it is resolved without establishing a connection between the callers, for example by sending one or more of the contending calls to voicemail.

DETAILED DESCRIPTION

I. Overview of One Exemplary Embodiment

In one exemplary embodiment, a call contention mediation system is implemented in a cellular telephone communications network. The system provides two different protocols for handling a symmetric call contention that occurs when two telephones attempt to call one another at approximately the same time. Normally, the system performs a default contention resolution protocol. During a period after a call is dropped, the system performs a post-drop contention resolution protocol for calls between the telephones that were on the dropped call.

In an example of a default contention resolution protocol, the system routes each call to the voicemail of the other telephone. In an example of a post-drop contention resolution protocol, the system cancels one of the calls and enables the other call to proceed.

In a preferred embodiment, the post-drop contention resolution protocol may be performed only if the call contention occurs within a limited time window, such as fifteen seconds, thirty seconds, one minute, or some other predefined interval after the call drop.

A system according to this embodiment offers a way of handling call contention without excessive disruption of the expected user experience. Consider the point of view of a telephone user in this system. In one case, the user is attempting to make a call to a friend over the telephone. If the friend, possibly out of pure coincidence, attempts to call the user at the same time, the user's call will simply be routed to the friend's voicemail, an occurrence to which the user is likely accustomed.

In another case, the user is already speaking with his friend over the telephone. The call, though, may involuntarily be dropped, particularly if one of the parties is traveling from one cell to another. Shortly after the call is dropped, both parties may attempt to re-establish a call by dialing one another at almost the same time. In this case, being routed to voicemail because of a call contention would be frustrating: not only does each party know that the other is available and willing to speak, but both have already had to deal with the inconvenience of a dropped call. In a system according to this embodiment, though, the post-drop protocol is in effect, and a call is re-established between the two parties, not routed to voicemail. Because the two parties were speaking just moments earlier, there is likely to be little confusion about who is on the line, and any confusion about how they came to be connected (e.g., who called whom) is outweighed by the greater frustration that would result if both calls were routed to voicemail. Indeed, if the user is routed to voicemail after a call is dropped, he may incorrectly assume that his friend has moved out of range, lost battery power, or has otherwise become unavailable, when in fact the friend is simply trying to call back.

II. A Call Contention Mediation System

Figure 1:
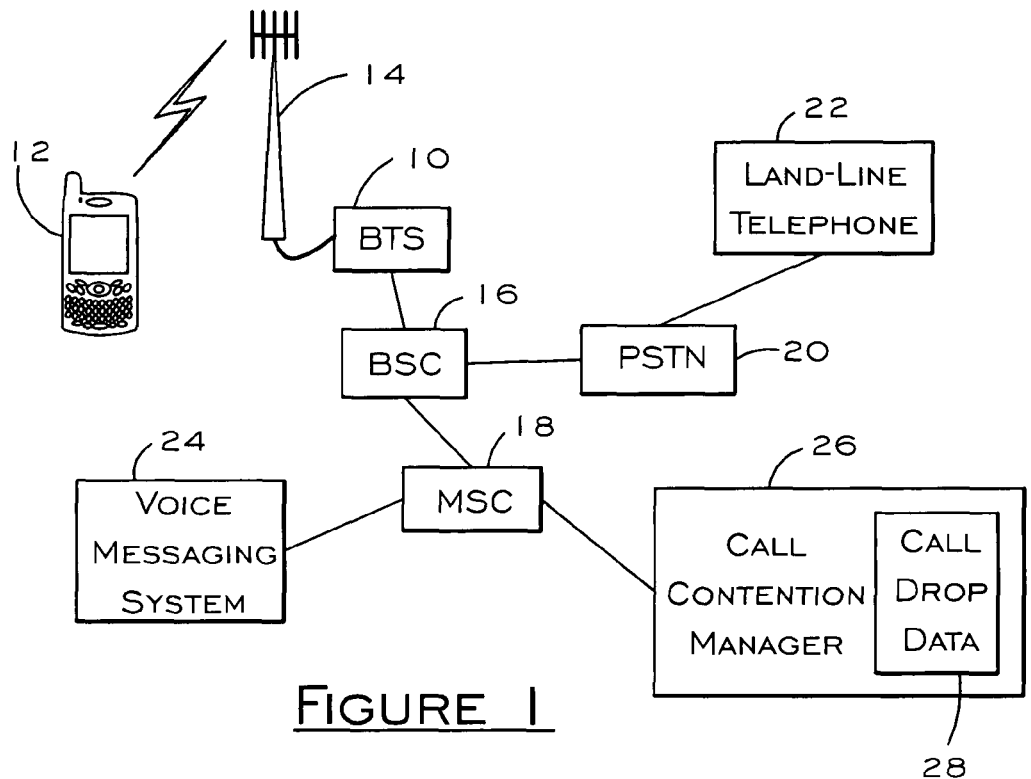
FIG. 1 is a schematic block diagram illustrating the functional architecture of a telecommunications system including a call contention manager.

A telecommunications system with call contention mediation features is illustrated in FIG. 1. The system includes a plurality of base transceiver stations (BTS) 10, which provide radio frequency voice communications with mobile stations (MS) 12, such as cellular telephones, through a radio frequency (RF) communications facility 14, such as a cell tower. The base transceiver stations 10 are operated by base station controllers (BSC) 16. The base station controllers communicate through a mobile switching center (MSC) 18 with, for example, the public switched telephone network (PSTN) 20. Communications between the mobile stations and land line telephones, such as telephone 22, takes place through the public switched telephone network 20. A voicemail or voice messaging system 24 records and provides access to voice messages for the mobile stations 12.

The mobile stations, base transceiver stations, base station controllers, and mobile switching center communicate among themselves using control messages to set up, manage, and terminate voice calls and other communications.

In the embodiment of FIG. 1, a call contention manager 26 is provided to enable implementation of a default call contention protocol and a post-drop call contention protocol. The call contention manager may be, as illustrated in FIG. 1, a separate entity from the mobile switching center, or it may be implemented as logical hardware or software instructions provided at the mobile switching center.

The base station controllers are operative to report call drop events to the mobile switching center. The mobile switching center is operative in turn to report the call drop events to the call contention manager. The call contention manager is provided with call drop data 28, in which records pertaining to call drop events are stored. The call drop data may be implemented as a database or other data collection or data structure, preferably one in which each record corresponds to a call drop event.

In one embodiment, the mobile switching center is itself operative to detect call collisions. In such an embodiment, the mobile switching center reports the call collisions to the call contention manager. In another embodiment, the mobile switching center is operative to provide call setup information (which may constitute and/or be derived from control messages) to the call contention manager, and the call contention manager is operative to identify the presence of a call contention condition from the call setup information it receives.

The call contention manager is further operative, in response to the detection of a call contention condition between telephones, to determine whether the call contention follows shortly after those telephones recently experienced a call drop event. To aid in providing this functionality, the call drop record may include a time code indicating when the call drop event occurred, and the call contention manager may include or have access to a clock or other timer. In such an embodiment, the call contention manager is operative to compare the time code with information from the timer to determine whether the call contention condition occurs within a predetermined time window after the call drop event.

The call contention manager uses the information it receives regarding call drop events and call contentions to select what protocol should be used to resolve a call contention. In making this selection, the call contention manager may also take into consideration information on whether any affected telephone is a land-line telephone or is otherwise accessed only over the public switched telephone network. The mobile switching center is operative to resolve call contentions based on information received from the call contention manager.

The mobile switching center may operate to resolve call contentions according to a default protocol if no contrary instruction is received from the call contention manager, or if the mobile switching center receives an instruction directing it to use the default protocol. Otherwise, the mobile switching center may respond to instructions from the call contention manager to use the post-drop contention resolution protocol.

In a preferred embodiment, a default contention resolution protocol results in the mobile switching center routing each call to the voicemail of the other telephone, or, if no voicemail service is associated with a telephone, the other telephone may be provided with a "busy signal," indicating that no transmission path is available to the called telephone.

In response to information from the call contention manager that a post-drop contention resolution protocol should be implemented, the mobile switching center attempts to establish a connection between the colliding calls. In a preferred embodiment, this is done by canceling one of the calls, and enabling connection of the other call.

The mobile stations and other telephones, base transceiver stations, base station controllers, and voice messaging systems described herein may be conventional components operating as understood by those skilled in the art. The mobile switching center and call contention manager may similarly be implemented using conventional components that have been modified or supplemented, in hardware or in software to provide the functionality described herein. In particular, the mobile switching center and call contention manager may be implemented in a single computer server or separate servers, each provided with one or more processors, one or more network connections, and digital data storage. The digital data storage, which may be magnetic, optical, solid state, or some combination of these, includes instructions executable by the processor or processors to perform the functions described herein.

III. A Call Contention Mediation Method

Figure 2:
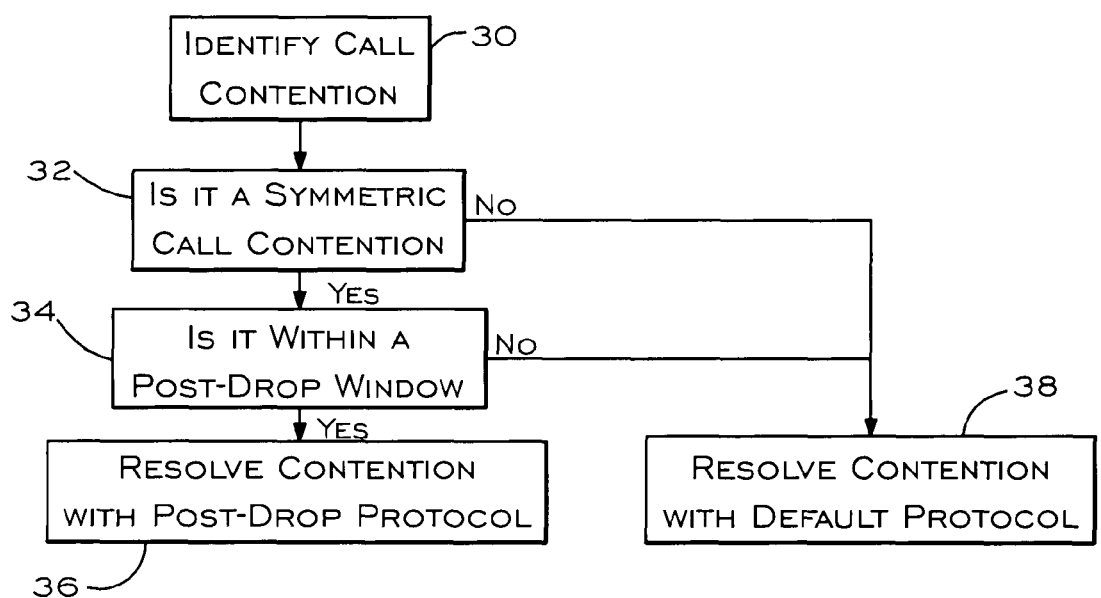
FIG. 2 is a flow diagram illustrating steps involved in an embodiment of a call contention mediation method.

As described below, a call contention mediation system may operate using one or more of various methods. As illustrated in FIG. 2, a first step 30 in one such method is identifying that a call contention condition is present. If so, it is determined in step 32 whether the call contention is symmetric, as is the case when two telephones attempt to dial one another at approximately the same time. It is also determined in step 34 whether the symmetric call contention falls within a post-drop window.

If the call contention is a symmetric call contention and falls within a post-drop window, the system implements a post-drop contention resolution protocol in step 36. If the call contention is not determined to be symmetric, or if it is not determined to be within a post-drop window, the system implements a default contention resolution protocol in step 38.

Although FIG. 2 illustrates the steps as being performed in a particular order, a decision can be made as to whether to use a default or a post-drop protocol without performing the steps in that same order. For example, the step of determining whether a call contention is within a post-drop window may be performed before determining whether the call contention is a symmetric call contention. In another embodiment, the determination of whether a call is made in a post-drop window can be performed before any call contention is identified.

Similarly, ordinal adjectives such as "first" and "second" are used herein to distinguish entities from one another. Unless otherwise required by context, these terms are not intended to require that the described entities have performed actions in any particular order with respect to one another.

In determining whether the call contention is within a post-drop window, a call contention manager may first determine whether one or more of the contending calls is associated with call drop record in a collection of call drop data. In an embodiment in which each call drop record includes telephone number or international mobile subscriber identity (IMSI) information identifying one or more of the telephones that were on the dropped call, the call drop manager locates (or confirms the absence of) a call drop record based on that identifying information, using, for example, a hash table or search capability.

In an embodiment in which all or part of the call drop data is purged regularly, or in which the oldest records are "pushed" out of the data, or other embodiment in which older records are removed from the call drop data while newer records are retained, the mere presence of a call drop record may indicate that the contention is within a post-drop window. In other embodiments, the call drop record includes data identifying the time at which the call was dropped, and using a predetermined period (e.g., thirty seconds), the call contention manager determines whether more time than allotted by the predetermined period has passed. In still other embodiments, the post-drop window ends when one of the associated telephones attempts to establish a call with a party other than the party from whom he was dropped, or immediately after attempting to establish a call with the party from whom he was dropped.

In an alternative embodiment, the step of determining whether the call contention condition is symmetric is not expressly performed. Instead, in some embodiments, it is sufficient simply to determine that one or both callers in the contending calls are within a call drop window. If a caller experiences a call drop, it is likely that the next number he will dial is to the telephone from which he was just dropped. As a result, it is likely that if a call contention arises for a telephone that has just experienced a call drop, that call contention is a symmetric call contention that should be resolved using the post-drop protocol. If both participants in a dropped call are involved in a call contention shortly after the call drop, it is very likely that they are attempting to call one another, resulting in a symmetric call contention. Given the large number of telephone calls that are made, this alternative embodiment would occasionally, though coincidence, result in the post-drop protocol being implemented to connect two callers who did not experience a call drop with each other, and the protocol should be designed to operate without failure in this case.

It should be noted that the implementation of the default protocol and the post-drop protocol may vary based on information other than simply whether the contending calls fall within a post-drop window. This can be done in part to accommodate subscribers of different wired and wireless telecommunications service providers, each of which may support or fail to support different and partially incompatible levels of service. For example, as described above, the default protocol preferably involves sending one or both calls to voicemail. Such a default protocol may also involve checking for the presence of voicemail services and, if none are present on one telephone, provide a busy signal on the line of the contending telephone.

In another example, the post-drop protocol can operate in different ways to connect the contending calls depending on the features available from the telecommunications service provide associated with each of the contending callers. For example, an analog land-line telephone, unlike many mobile telephones, cannot be forced into an "on hook" condition to permit an incoming call to ring through. As a result, the post-drop protocol may determine which, if any, of the contending callers are calling from a land-line telephone and consequently cancel the call being made from the mobile telephone. If both callers are calling from mobile telephones, the post-drop protocol may involve determining which one of the two calls to drop.

Some steps involved in implementing either the default or the post-drop protocol may be performed before, or in parallel with, any decision as to which protocol should be implemented. For example, the contention resolution manager may determine a priority between contending calls (based on a comparison of telephone numbers or by another protocol) before any decision is made as to whether to cancel a call at all.

The default protocol need not be a protocol that is implemented only in case of a call contention. For example, the default protocol may simply be that any call directed to an off-hook telephone will be routed to voicemail (or, as another example, to a live operator or receptionist, or to a queue). This protocol may be implemented whether or not there is any relevant call contention, but it can also be effective in resolving any call contentions that do happen to arise.

The implementation of a post-drop protocol, rather than a default protocol, may be initiated by attempting to preempt operation of the default protocol. For example, the mobile switching center may be a mobile switching center with the responsibility of implementing the default protocol. In this embodiment, the mobile switching center implements the default protocol absent any contrary instruction from the call contention manager. The call contention manager, through monitoring of control messages and/or through other reports received from the mobile switching center, determines whether to initiate the post-drop protocol. The call contention manager may expressly instruct the mobile switching center to implement a post-drop protocol, or the call contention manager may more directly effect the implementation of the post-drop protocol by, for example, instructing the mobile switching center to cancel one of the outgoing calls involved in a call collision.

The term "default protocol" is used herein only to distinguish from the post-drop protocol. The term is not intended to imply that, for example, the default protocol as described herein necessarily corresponds to any default software or hardware flags, parameters, or settings of the mobile switching center or other components.

Figure 3:
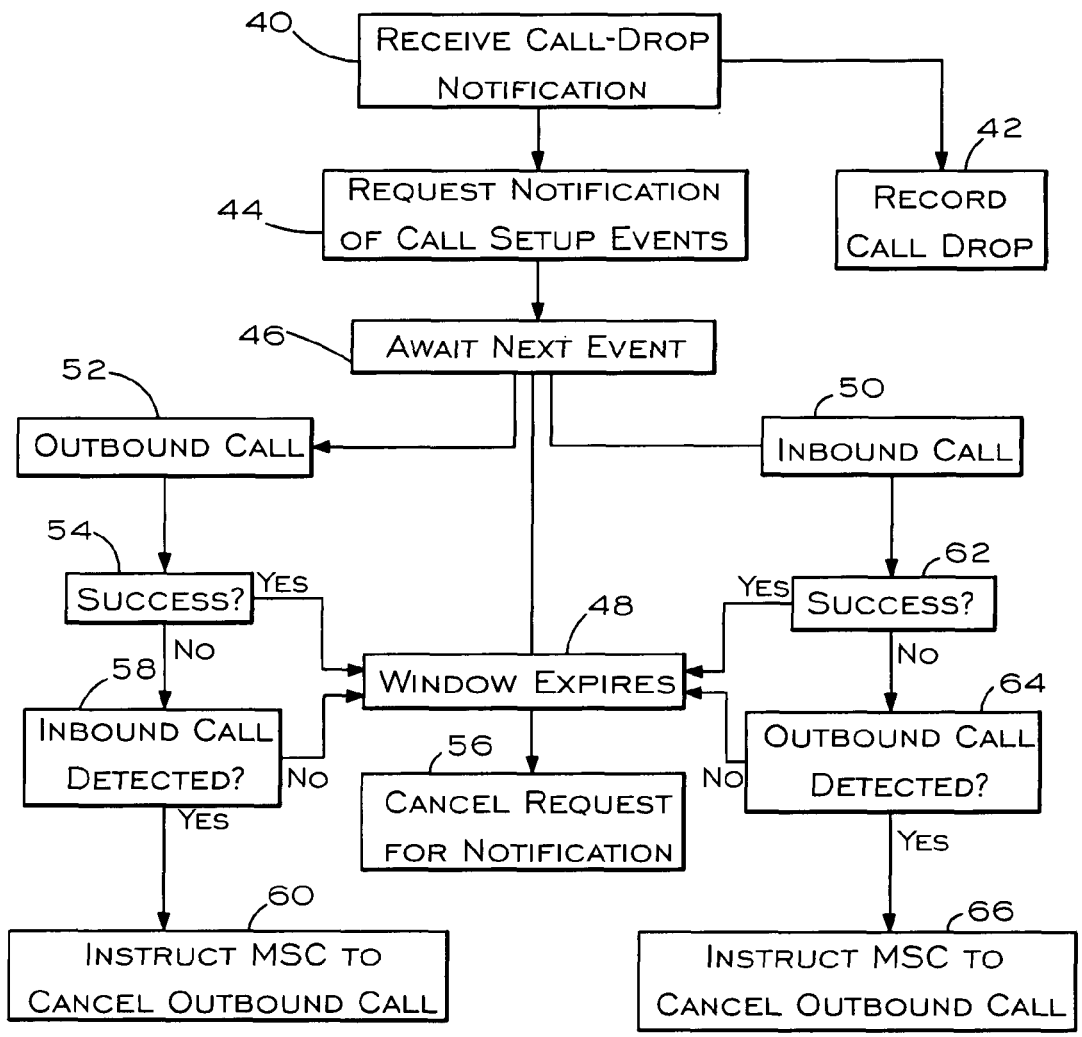
FIG. 3 is a flow diagram illustrating steps involved in another embodiment of a call contention mediation method.

FIG. 3 illustrates a call contention mediation routine, as performed by a call contention manager through, for example, software installed on the mobile switching center or on a separate call contention manager computer. The call contention manager receives a notification in step 40, e.g. from a mobile switching center, that a call drop has taken place. The call contention manger records information about the call drop in step 42, such as the numbers of the telephones involved in the dropped call and the time at which the call drop took place. In this embodiment, recording the call drop and the time at which it took place sets the beginning of the call drop window. The call drop manager also, in response to the dropped call, sends a message to the mobile switching center in step 44 requesting notification of call setup events relating to one or more of the telephones involved in the dropped call. (In an alternative embodiment, the call contention manager itself monitors control messages and filters out those not needed to identify a post-drop call contention condition.)

The call contention manager then enters a state 46, in which it awaits the next event. If the telephones involved in a dropped call take no further action, then the call contention manager may not receive any relevant notifications from the mobile switching center, and the call drop window may expire in step 48. Otherwise, the call contention manager receives an indication from the mobile switching center that a call is being initiated.

The terms "outbound" and "inbound" are used here and in FIG. 3 as viewed from the perspective of a mobile station serviced by the mobile switching center. Thus, a call setup event is inbound if is directed to a mobile station serviced by the mobile switching center and outbound if it is initiated from such a mobile station.

If the call setup notification indicates that there is an inbound call, the call contention manager enters one state (inbound-call state 50), and if the call setup notification indicates that there is an outbound call, the mobile switching center enters another state (outbound-call state 52).

If the call setup notification was associated with an outbound call, the mobile switching center enters a state 54 in which it awaits a report that the outbound call was completed successfully. If it receives a report of success, the contention mediation manager exits the routine, and it causes the post-drop window to expire and, in step 56, sends a message to the mobile switching center canceling the notification request previously sent in step 44. If no report of success is received, the routine determines in step 58 whether an inbound call is being made to the mobile station (and, optionally, whether that inbound call is being made from the telephone on the call that was recently dropped, or whether the inbound call is being made from a telephone that itself recently experienced a call drop event). If such an inbound call is being made, the call contention manager instructs the mobile switching center to cancel the outbound call in step 60. Canceling the outbound call has the effect of allowing the inbound call to connect with the mobile station. If no inbound call was detected, the failure of the outbound call is likely due to a reason other than a call contention condition, and the routine exits.

If the call setup notification was associated with an inbound call, the mobile switching center enters a state 62 in which it awaits a report that the inbound call was completed successfully. If it receives a report of success, the contention mediation manager exits the routine, and it may cause the post-drop window to expire and/or cancel the notification request previously sent to the mobile switching center. If no report of success is received, the routine determines in step 64 whether an outbound call is being made from the mobile station. If such an outbound call is being made, the call contention manager, in step 66, instructs the mobile switching center to cancel the outbound call. In an alternative to step 66, the call contention manager instructs the mobile switching center to connect the inbound and outbound calls without canceling either call. If no outbound call was detected, the failure of the inbound call is likely due to a reason other than a call contention condition, and the routine exits.

The invention claimed is:

1. A method carried out by at least one network entity, the method comprising:
   detecting a call contention between a first call made by a first caller and a second call made by a second caller, wherein the call contention comprises the first call being made to the second caller when the second call is being made to the first caller;
   making a determination of whether the call contention was detected within a call drop window after a call drop experienced by at least one of the first and second callers; and
   responsive to the determination being that the call contention was detected within the call drop window, resolving the call contention with a post-drop protocol that establishes a connection between the first and second callers, wherein resolving the call contention with the post-drop protocol comprises connecting exactly one of the first and second calls.

2. The method of claim 1, wherein resolving the call contention with the post-drop protocol further comprises causing exactly one of the first and second calls to be canceled, wherein the canceled call is the call other than the call that is connected.

3. The method of claim 2, wherein resolving the call contention with the post-drop protocol further comprises:
   determining that exactly one of the calls is from a mobile telephone; and
   causing the call that is from the mobile telephone to be canceled.

4. The method of claim 2, wherein the post-drop protocol further comprises:
   determining that exactly one of the two calls has priority; and
   causing the call that does not have priority to be canceled.

5. The method of claim 1, wherein making the determination of whether the call contention was detected within the call drop window comprises determining that the first caller and the second caller each experienced a respective call drop, wherein the respective call drop of the first caller is experienced at approximately the same time as the respective call drop of the second caller.

6. The method of claim 1, wherein making the determination of whether the call contention was detected within the call drop window comprises determining that both the first caller and the second caller were dropped from a call with each other.

7. The method of claim 1, wherein the call drop window ends at a predetermined time after the at least one experienced call drop.

8. The method of claim 1, further comprising:
detecting a plurality of call drops, wherein each detected call drop is experienced by at least one caller of a respective pair of callers; and
for each detected call drop, creating at least one record of the detected call drop, wherein each such record includes information identifying at least one of the callers of the respective pair of callers that the detected call drop was between,
wherein the step of making the determination of whether the call contention was detected within the call drop window includes making a determination of whether at least one of the first and second callers is identified in at least one of the records.

9. The method of claim 8, wherein making the determination of whether the call contention was detected within the call drop window includes making a determination of whether exactly both the first caller and the second caller are identified in at least one record.

10. The method of claim 9, wherein making the determination of whether the call contention was detected within the call drop window includes making a determination of whether exactly both the first caller and the second caller are identified in the same record.

11. The method of claim 8, wherein each such record further includes information identifying the time of that call drop.

12. A method carried out by at least one network entity, the method comprising:
detecting a call contention, wherein the call contention is between a pair of calls made by a respective pair of callers;
making a determination of whether the call contention occurred within a call drop window after at least one caller in the pair experienced a call drop;
if the determination is that the call contention was detected within the call drop window, resolving the call contention with a post-drop protocol that establishes a connection between the respective pair of callers, wherein resolving the call contention with the post-drop protocol comprises (i) connecting exactly one call of the pair of calls, and (ii) causing the other call of the pair of calls to be canceled; and
if the determination is that the call contention was not detected within the call drop window, resolving the call contention with a default protocol that does not establish a connection between the respective pair of callers.

13. The method of claim 12, wherein the default protocol comprises directing at least the first call to a voicemail of the second caller.

14. The method of claim 13, wherein the default protocol further comprises directing the second call to a voicemail of the first caller.

15. A system comprising:
a mobile switching center; and
a call contention manager,
wherein the call contention manager is operative to determine whether a call contention between two calls made by two callers takes place within a call drop window, to cause the call contention to be resolved at least in part by the mobile switching center according to a post-drop protocol if the contention takes place within the call drop window, and to cause the call contention to be resolved at least in part by the mobile switching center according to a default protocol if the contention does not take place within the call drop window,
wherein the post-drop protocol connects exactly one of the two calls so as to establish a connection between the two callers, and causes the other of the two calls to be canceled, and
wherein the default protocol does not connect either of the two calls.

16. The system of claim 15, wherein the call contention manager is implemented at the mobile switching center.

17. The system of claim 15, wherein the call contention manager is operative, in response to a determination that the call contention is to be resolved according to the post-drop protocol, to instruct the mobile switching center to cancel one of the contending calls.

18. The system of claim 15, wherein the mobile switching center is operative, in the absence of a contrary instruction from the call contention manager, to resolve the call contention by routing at least one of the contending calls to voicemail.

19. The system of claim 15, wherein the call contention manager is operative to receive call drop data, wherein the call drop data includes data identifying, for each of a plurality of call drop events, a time at which the call was dropped.

* * * * *